US008665248B2

(12) United States Patent
Yamashita

(10) Patent No.: US 8,665,248 B2
(45) Date of Patent: Mar. 4, 2014

(54) DRIVE CIRCUIT

(75) Inventor: Keitaro Yamashita, Kobe (JP)

(73) Assignee: TPO Displays Corp., Miao-Li County (TW)

( * ) Notice: Subject to any disclaimer, the term of this patent is extended or adjusted under 35 U.S.C. 154(b) by 653 days.

(21) Appl. No.: 12/332,751

(22) Filed: Dec. 11, 2008

(65) Prior Publication Data

US 2009/0160842 A1 Jun. 25, 2009

(30) Foreign Application Priority Data

Dec. 19, 2007 (JP) ................................. 2007-327716

(51) Int. Cl.
*G06F 3/038* (2013.01)

(52) U.S. Cl.
USPC ............................ 345/204; 345/205; 345/214

(58) Field of Classification Search
USPC ............ 345/100, 204–205, 214, 211, 51, 55, 345/80, 98–99
See application file for complete search history.

(56) References Cited

U.S. PATENT DOCUMENTS 3,937,982 A * 2/1976 Nakajima ....................... 326/98
4,017,741 A * 4/1977 Briggs ............................ 377/79
5,136,622 A * 8/1992 Plus ................................ 377/64
5,222,082 A * 6/1993 Plus ................................ 377/79
5,434,899 A * 7/1995 Huq et al. ....................... 377/78
5,517,542 A * 5/1996 Huq ................................ 377/78
5,701,136 A * 12/1997 Huq et al. ..................... 345/100
5,949,398 A * 9/1999 Kim .............................. 345/100
6,049,228 A * 4/2000 Moon ............................. 326/81
6,052,426 A 4/2000 Maurice et al.
6,064,713 A 5/2000 Lebrun et al.
6,522,323 B1 * 2/2003 Sasaki et al. .................. 345/204
6,556,646 B1 * 4/2003 Yeo et al. ........................ 377/54
6,788,108 B2 * 9/2004 Miyake et al. .................. 326/88
7,202,606 B2 * 4/2007 Eom et al. .................. 315/169.3
7,362,139 B2 * 4/2008 Miyake et al. .................. 326/88
7,724,231 B2 * 5/2010 Nakao et al. .................... 345/98
7,786,972 B2 * 8/2010 Jeong et al. ................... 345/100

(Continued)

FOREIGN PATENT DOCUMENTS

JP 4941700 11/1974
JP 04345361 A 12/1992

(Continued)

*Primary Examiner* — Jason Mandeville
(74) *Attorney, Agent, or Firm* — Morris Manning & Martin LLP; Tim Tingkang Xia, Esq.

(57) ABSTRACT

A drive circuit is disclosed. The drive circuit includes a first p-typed thin film transistor (PTFT), a second PTFT, a first n-typed thin film transistor (NTFT), a second NTFT and a capacitor. The drain of the first PTFT is coupled to a first electrical line, and the gate thereof is coupled to a first clock line. The drain of the second PTFT is coupled to a second clock line, and the source thereof is coupled to an output. The source of the first NTFT is coupled to a second electrical line, and the gate thereof is couple to an output of a preceding drive circuit. The source of the second NTFT is couple to a third electrical line, the gate thereof is coupled to a third clock line, and the drain thereof is coupled to the output. The capacitor has one end coupled to the second electrical line, while the other end is coupled to the source of the first PTFT, the drain of the first NTFT and the gate of the second PTFT.

12 Claims, 5 Drawing Sheets

(56) References Cited

U.S. PATENT DOCUMENTS

| | | | | |
|---|---|---|---|---|
| 7,894,566 | B2 * | 2/2011 | Hsiao et al. | 377/64 |
| 2002/0186196 | A1 * | 12/2002 | Park | 345/100 |
| 2003/0011584 | A1 * | 1/2003 | Azami et al. | 345/204 |
| 2003/0020520 | A1 * | 1/2003 | Miyake et al. | 327/112 |
| 2003/0117352 | A1 * | 6/2003 | Kimura | 345/87 |
| 2004/0227718 | A1 * | 11/2004 | Park | 345/100 |
| 2005/0220262 | A1 * | 10/2005 | Moon | 377/64 |
| 2006/0267912 | A1 * | 11/2006 | Lee et al. | 345/100 |
| 2007/0195053 | A1 * | 8/2007 | Tobita et al. | 345/100 |

FOREIGN PATENT DOCUMENTS

| | | | |
|---|---|---|---|
| JP | 08221039 | A | 8/1996 |
| JP | 2001176288 | A | 6/2001 |
| JP | 2002197885 | A | 7/2002 |
| JP | 2004334926 | A | 11/2004 |
| JP | 2005189488 | A | 7/2005 |
| JP | 2006146094 | A | 6/2006 |
| JP | 2007076062 | A | 3/2007 |

* cited by examiner

DRIVE CIRCUIT

FIELD OF THE INVENTION

The present invention relates to a drive circuit for use in a liquid crystal display (LCD). Particularly, the present invention relates to a gate drive circuit having a reduced layout width for use in a low temperature polysilicon LCD (LTPS LCD).

BACKGROUND OF THE INVENTION

For constructing a liquid crystal display (LCD), two transparent substrates are disposed parallel to each other in such a way that the surfaces thereof, on which the respective pixel electrode and common electrode are configured, are facing to each other, while a liquid crystal layer is sandwiched therebetween. Among the LCDs, the active-matrix LCD adopts a matrix of pixel electrodes to display the pixels, and therein switch devices are arranged in the vicinity of each pixel electrode on the transparent substrate, for switching on and off the respective pixel electrodes.

With reference to FIG. 6, the structure and operation of a conventional low temperature polysilicon liquid crystal display (LTPS LCD) are schematically shown. As shown in FIG. 6, the liquid crystal (LC) panel 1 is an active-matrix LC panel having a plurality of pixel electrodes 30, a plurality of scan lines 31, a plurality of data lines 32, a plurality of switching devices 33 and a plurality of reference electrodes 34.

The pixel electrodes 30 are arranged in columns and rows forming a matrix. There are p scan lines 31 arranged along the row direction of the LC panel 1 for selecting the pixels in the same direction, while q data lines 32 are arranged along the column direction of the LC panel 1 for transmitting an applied voltage, which is corresponding to the data to be displayed, to the pixels in the same row direction. The switching devices 33 function for transmitting the data of data lines to the pixels of LC cells through the scanning signals, and are constructed by such as thin film transistors (TFTs). The reference electrodes 34 supply a common voltage level to the respective LC cell located between a set of pixel electrode 30 and reference electrode 34. The LC cell located between a set of pixel electrode 30 and reference electrode 34 is termed as a pixel.

The LC cell utilizes the voltage applied between the pixel electrode 30 and the reference electrode 34 to adjust the light. While the pixels are regularly divided into R, G and B pixels, and the color filters R, G and B are correspondingly arranged at the reference electrodes 34, a color image composed of R, G and B pixels can be displayed. Accordingly, the data lines 32 can be divided to correspond to the R, G and B data based upon the arrangement of R, G and B pixels.

The gate drive circuit 2 functions to apply P scanning signals X1, X2, . . . , Xp subsequently to the scan lines 31 in the LC panel 1. The source drive circuit 3 functions to output the display data as pixel signals Y1, Y2, . . . , Yq, so as to correspondingly generate an applied voltage level for the data lines 32 in the LC panel 1. The signal processing circuit 4, i.e. the control circuit, provides the gate drive circuit 2 and the source drive circuit 3 with a control signal when an external image signal is input and the display data is output to the source drive circuit 3.

The display operation of the LC panel 1 is illustrated as follows. The gate drive circuit 2 is controlled by a control signal from the signal processing circuit 4. The signal processing circuit 4 also supplies scanning signals to any column of scan lines 31. In this case, the switch devices 33 in one column are switching to ON state, and each row of data lines

32 as well as pixel electrodes 30 corresponding to this column are conducted. Data for each row of pixels corresponding to a column of scan lines 31, is supplied to the source drive circuit 3 from the signal processing circuit 4 in advance. Besides, while the switch devices 33 are switching to ON state, the display data is transferred, by the source drive circuit 3, as an applied voltage for each pixel electrode 30 to output. In addition, by scanning from the top column (i=1) to the foot column (i=p) of scan lines 31 of the LC panel 1, the signal processing circuit 4 supplies the display data to all the pixel electrodes 30.

Such conventional gate drive circuit has a layout width of 700~1000 μm. Since the gate drive circuit is arranged at the periphery of a display device, the arrangement of further circuits would be limited, or the display area of the display device may be reduced owing to the space occupied by the gate drive circuit. For the small-sized portable display device, it is a critical issue to reduce the space occupied by the periphery circuits since a relatively large space thereof does bring a considerable disadvantage therefor.

For example, the gate drive circuits constructed by the shift registers as disclosed by U.S. Pat. No. 6,052,426 and by U.S. Pat. No. 6,064,713 are schematically shown in FIGS. 7 and 8, respectively. It may be possible to adopt such conventional gate drive circuits in an LTPS LCD. Nevertheless, the space occupied by the mentioned circuits and thus the total space are quite considerable since those circuits adopt more than two capacitors therein.

SUMMARY OF THE INVENTION

The present invention provides a drive circuit with a reduced area for use in a low temperature polysilicon liquid crystal display (LTPS LCD). Particularly, the present invention provides a drive circuit for use in a display of small size which requires an extremely small space for the gate drive circuit, and or use in a device of a reduced space owing to the additional functions such as sensors configured therein.

According to the present invention, the provided drive circuit includes: a first p-typed thin film transistor having a source, a drain coupled to a first electrical line and a gate coupled to a first clock line; a second p-typed thin film transistor having a gate, a drain coupled to a second clock line and a source coupled to an output; a first n-typed thin film transistor having a drain, a source coupled to a second electrical line and a gate coupled to an output of a preceding driving circuit; a second n-typed thin film transistor having a source coupled to a third electrical line, a gate coupled to a third clock line and a drain coupled to the output; and a capacitor having one end coupled to the second electrical line and another end coupled to the source of the first p-typed thin film transistor, the drain of the first n-typed thin film transistor and the gate of the second p-typed thin film transistor.

Preferably, the gate of the first n-typed thin film transistor has a bi-directional selection function.

Preferably, the second p-typed thin film transistor and/or the second n-typed thin film transistor is a double gate thin film transistor.

Preferably, the output has an enable function having an output coupled to an input of a next driving circuit and a drive signal is output from the output of the enable function.

Preferably, the drive circuit is a gate drive circuit.

According to the present invention, a display device having the drive circuit as mentioned is provided.

According to the present invention, an electronic device having the drive circuit as mentioned is provided.

Preferably, the electronic device is one selected from a mobile phone, a digital camera, a personal digital assistant, an aviation display, a digital picture frame and a handy DVD player.

The extremely large space occupied by the shift register in the gate drive circuit or a CS drive circuit can be reduced by the present invention. Furthermore, the layout of drive circuit is also reduced, and the image is effectively utilized even the display device is attached with additional functions such as small-sized or sensing.

While the foregoing object and features of the present invention are illustrated with reference to the accompanying drawings, it should be noted that the drawings and the embodiments are provided for illustration but not for limitation of the present invention.

DETAILED DESCRIPTION OF THE EMBODIMENTS

With reference to the following disclosures combined with the accompanying drawings, the operation of drive circuit according to the present invention is illustrated and understood. It should be noted that the following disclosures are provided for illustration, which is not limited in the disclosed gate drive circuit and is also applicable for other drive circuits such as a CS drive circuit.

Figure 1:
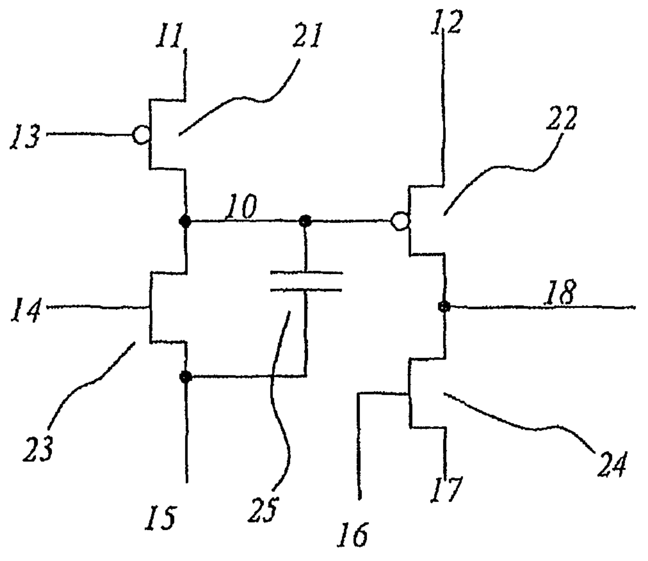
FIG. 1 is a diagram showing the gate drive circuit according to the present invention.

Referring to FIG. 1, the gate drive circuit in accordance with a first embodiment of the present invention is illustrated. The output line of the gate drive circuit is coupled to a row of gate lines of the display. Typically, the gate drive circuit is constructed by a plurality of sequent circuits illustrated as below in such a way that the output pulse is transmitted from the first row to the last row of gate lines based on the control signal.

As shown in FIG. 1, the gate drive circuit is constructed as follows. The drain of the first p-typed thin film transistor (TFT) 21 is coupled to the electrical line 11 (VGH), while the gate thereof is coupled to the first clock line 13 (Lx). The drain of the second p-typed TFT 22 is coupled to the second clock line 12 (Px), while the source thereof is coupled to the output 18. The source of the first n-typed TFT 23 is coupled to the electrical line 15 (VDD), while the gate thereof is coupled to the output 14 of a preceding row (the N−1-th) of circuit. The source of the second n-typed TFT 24 is coupled to the electrical line 17 (VGL), while the gate thereof is coupled to the third clock line 16 (INVPx) and the drain thereof is coupled to the output 18. Moreover, the capacitor 25 has one end coupled to the electrical line 15 (VDD), and has another end coupled to the source of the first p-typed TFT 21, the drain of the first n-typed TFT 23 and the gate of the second p-typed TFT 22.

Figure 2:
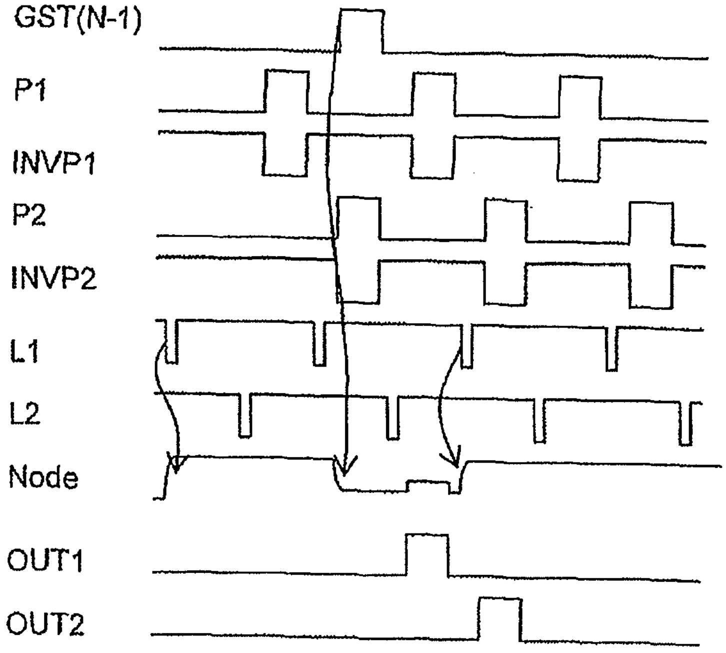
FIG. 2 is a diagram showing the timing of the gate drive circuit of FIG. 1.

With reference to FIG. 2, the operation of the gate drive circuit as shown in FIG. 1 is illustrated. In the case of applying a voltage level of 10V to the electrical line 11 (VGH), a voltage level of 5V to the electrical line 15 (VDD) and a voltage level of −7.5V to the electrical line 17 (VGL) as well, the node 10 (Node) would be charged to a voltage level of 10V. When an output voltage VGH of the N−1-th circuit is input to the gate of the first n-typed TFT 23, the capacitor 25 may discharge so that the voltage level of the node 10 becomes 5V since the electrical line (VDD) is at a voltage level of 5V. By means of the variation of voltage level as mentioned, the potential of the gate of second p-typed TFT 22 becomes negative and thus switches to ON state when the signal of the clock line 12 (P1) is at a high voltage level, for example, 10V. Accordingly, an output high voltage level of 10V is input to the gates of all the pixels arranged on this row of the gate lines so that all the pixels arranged on this row of the gate lines are switching to ON state.

Subsequently, the second p-typed TFT 22 is switching to OFF state when the clock line 12 (P1) returns to a low voltage level. In this case, the output is discharged and all the pixels on this row of the gate lines are switching to OFF state accordingly.

Furthermore, when the signal of the clock line 13 (L1) is at a low voltage level, the capacitor 25 is charged again. The node 10 is also charged to a voltage level of 10V through the first p-typed TFT. In the next stage, since the potential of the node 10 maintains at the level of 10V, the second p-typed TFT still keeps at OFF state even though the clock line 13 (P1) is at a high voltage level. Accordingly, the output 18 is not charged and maintains at a low voltage level VGL.

On the other hand, the high voltage level (10V) of the output 18 is input to the gate of the first n-typed TFT of the next (the N+1-th) circuit, and thus the N+1-th circuit also functions as mentioned. Afterward, a further next gate drive circuit, till the last one, may proceed with the mentioned operation, and a voltage of high level is subsequently output at the N-th output, the N+1-th output and so on.

Based on the above, the circuit as shown in FIG. 1 only adopts one capacitor in the gate drive circuit, which allows for a layout width of less than 200 μm for the gate drive circuit. Accordingly, the total space for such circuit is significantly reduced.

Figure 3A:
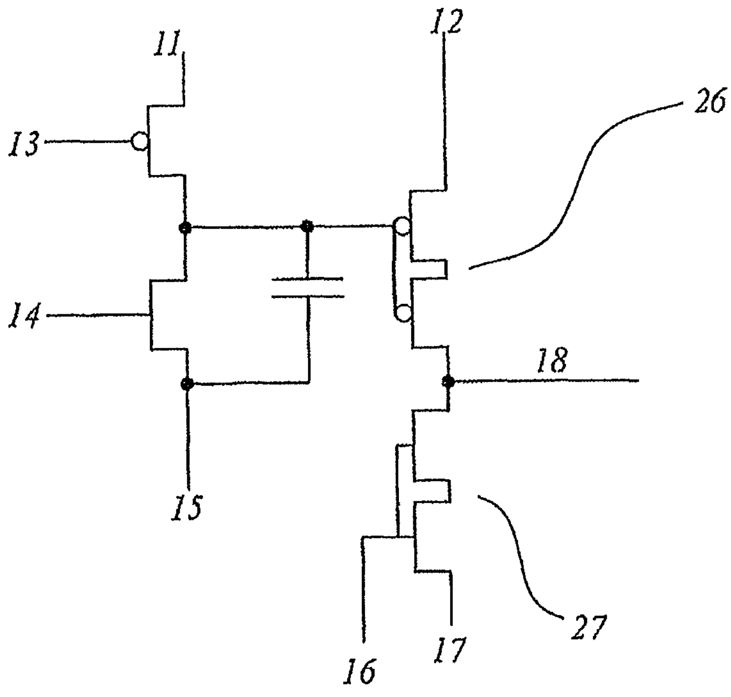
FIG. 3A is a diagram showing the gate drive circuit having a double gate thin film transistor therein.
Figure 3B:
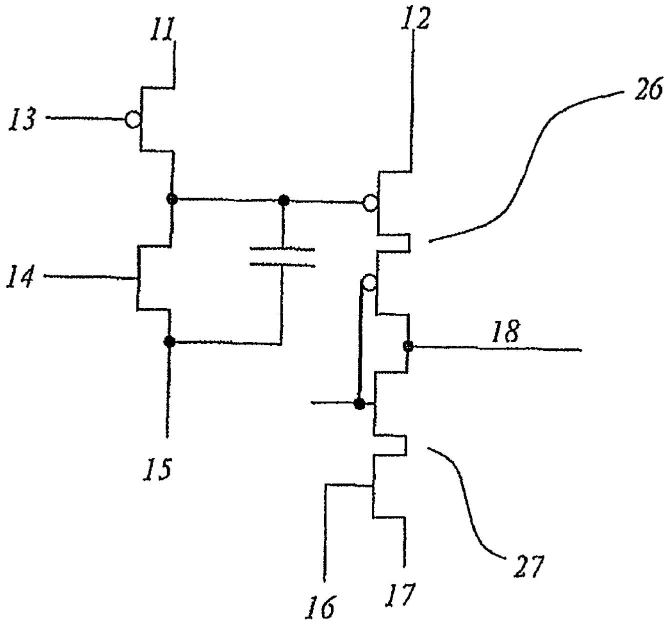
FIG. 3B is a diagram showing the gate drive circuit having a double gate thin film transistor therein.

FIGS. 3A and 3B schematically show a gate drive circuit according to the second embodiment of the present invention. The gate drive circuit as shown in FIGS. 3A and 3B is different from that of FIG. 1 in that a double gate TFT 26, 27 is adopted therein, instead of the second p-typed TFT 22 and the second n-typed TFT 24 in FIG. 1. In accordance with this embodiment, the voltage level desired for the gate is set to half of a typical level, so that the inferiority of thin film transistor due to being driven at a high voltage level is avoided.

Figure 4:
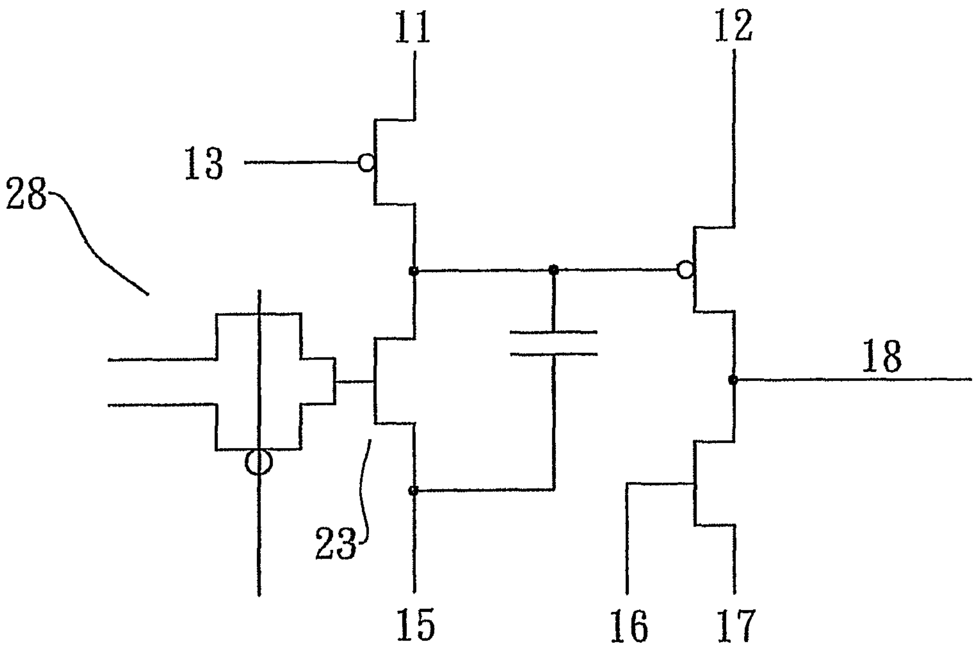
FIG. 4 is a diagram showing the gate drive circuit having a bi-directional selection function.

FIG. 4 shows a gate drive circuit according to the third embodiment of the present invention. The gate drive circuit as shown in FIG. 4 is different from that of FIG. 1 in that the gate of the first n-typed TFT 23, i.e. the gate being input with the output voltage of a preceding gate drive circuit, is attached with a bi-directional selection switching function 28. In this case, it allows for subsequently switching to ON state from the top row of circuit, or from the foot row of circuit.

Figure 5:
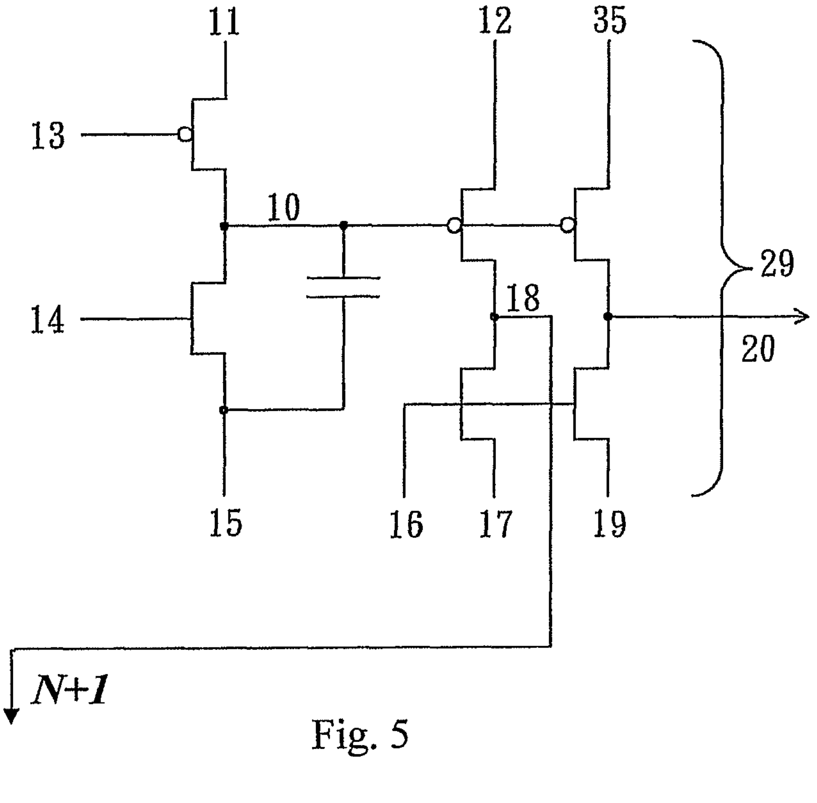
FIG. 5 is a diagram showing the gate drive circuit having an enable function.
Figure 6:
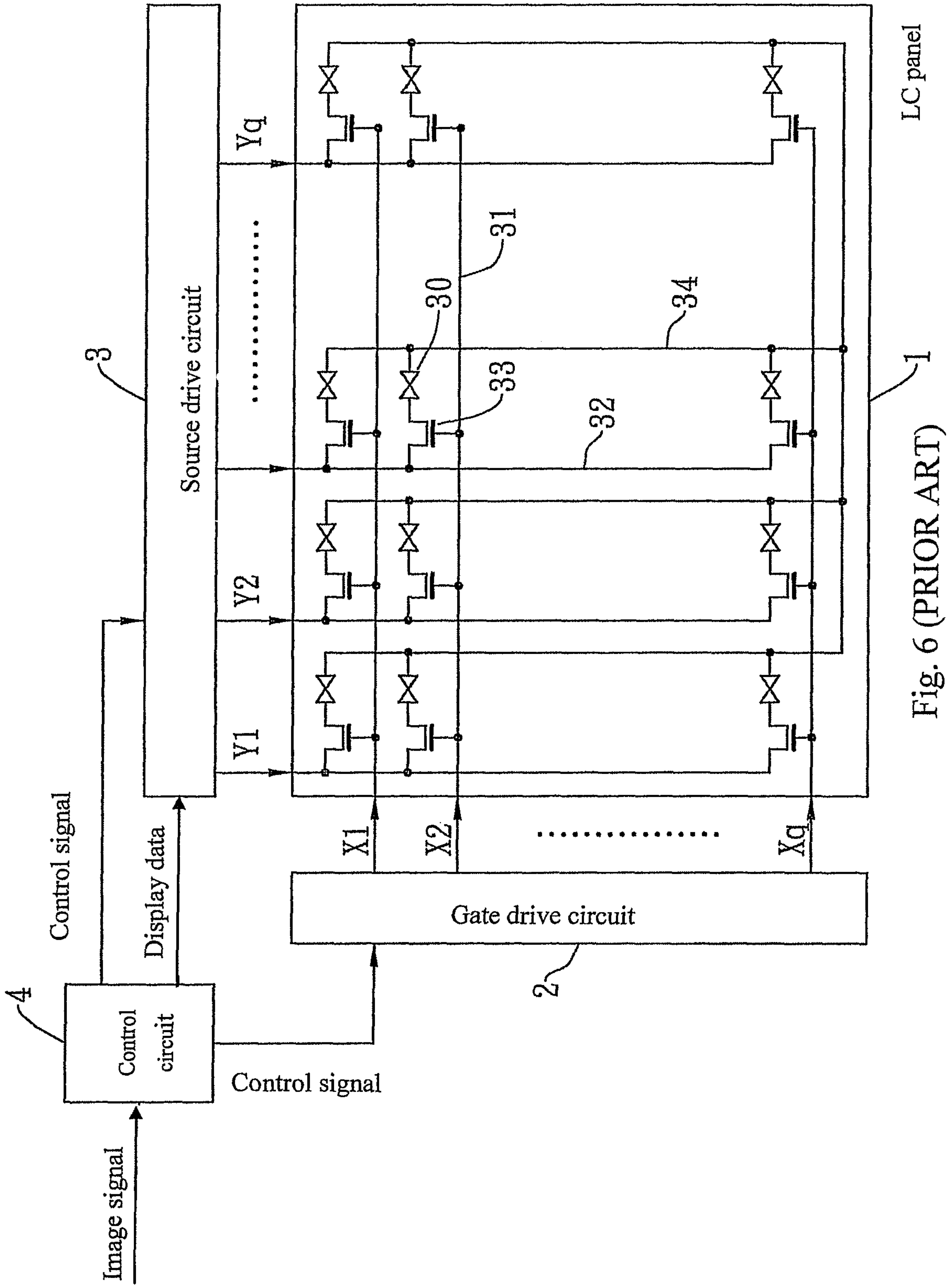
Fig. 6 (PRIOR ART)
FIG. 6 is a diagram schematically showing the structure of a conventional liquid crystal display according to the prior art.
Figure 7:
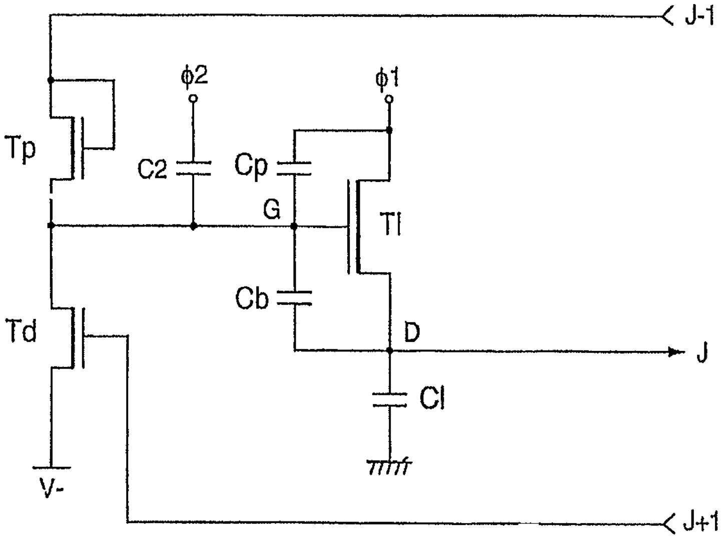
Fig. 7 (PRIOR ART)
FIG. 7 is a diagram showing a conventional gate drive circuit.
Figure 8:
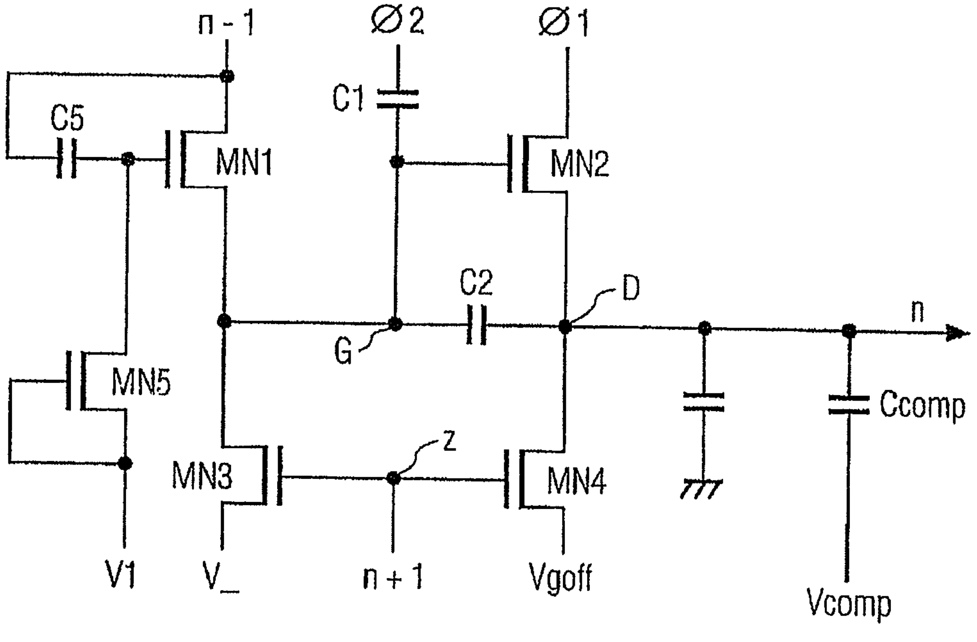
Fig. 8 (PRIOR ART)
FIG. 8 is a diagram showing a further conventional gate drive circuit.

FIG. 5 shows a gate drive circuit according to the fourth embodiment of the present invention. The gate drive circuit as shown in FIG. 5 is different from that of FIG. 1 in that the output 18 connected to the N+1-th input, is attached with an enable function 29. For example, by keeping the electrical line 35 (P1 enable) at a low voltage level, the N-th output 20 would not output a potential of high level so that all pixels of the N-th row switch to OFF state. On the other hand, take for example, while the electrical line 35 ($P1_{enable}$) is at a high voltage level, the N+1-th output 18 would be input with a high voltage level and thus all pixels of the N+1-th row are typically switching to ON state. Accordingly, by properly selecting the voltage P1 and $P1_{enable}$, the rows of pixels are partially driven.

While the invention has been described by way of examples and in terms of preferred embodiments, it is to be understood that various changes, substitutions, and alterations can be made herein without departing from the spirit and scope of the invention as defined by the appended claims.

What is claimed is:

1. A drive circuit comprising:

a first p-typed thin film transistor having a source, a drain directly connected to a first electrical line and a gate directly connected to a first clock line different from said first electrical line;

a second p-typed thin film transistor having a gate, a drain coupled to a second clock line and a source coupled to an output;

a first n-typed thin film transistor having a drain, a source directly connected to a second electrical line applied with a first voltage level and a gate directly connected to an output of a preceding drive circuit;

a second n-typed thin film transistor having a source directly connected to a third electrical line applied with a negative voltage level different from said first voltage level, a gate directly connected to a third clock line different from said output of said preceding drive circuit and a drain coupled to said output; and a capacitor having one end directly connected to said second electrical line and another end directly connected to said source of said first p-typed thin film transistor, said drain of said first n-typed thin film transistor and said gate of said second p-typed thin film transistor.

2. The drive circuit of claim 1, wherein said gate of said first n-typed thin film transistor has a bi-directional selection function.

3. The drive circuit of claim 1, wherein any one of:

said second p-typed thin film transistor and said second n-typed thin film transistor comprise a double gate thin film transistor.

4. The drive circuit of claim 1, wherein said output has an enable function having an output and a drive signal is output from said output of said enable function.

5. The drive circuit of claim 4, wherein said output is coupled to an input of a next drive circuit.

6. The drive circuit of claim 1, wherein said drive circuit comprises a gate drive circuit.

7. A display device comprising the drive circuit of claim 6.

8. An electronic device comprising the drive circuit of claim 1.

9. The electronic device of claim 8, wherein said electronic device is selected from any one of:

a mobile phone;

a digital camera;

a personal digital assistant;

an aviation display;

a digital picture frame; and a DVD player.

10. The drive circuit of claim 1, wherein said second electrical line is different from said third electrical line.

11. The drive circuit of claim 1, wherein said capacitor is discharged to the voltage of said second electrical line when the voltage of said output of said preceding drive circuit is at a high voltage level.

12. The drive circuit of claim 1, wherein said capacitor is charged to the voltage of said first electrical line when the voltage of said first clock line is at a low voltage level.

* * * * *

UNITED STATES PATENT AND TRADEMARK OFFICE

CERTIFICATE OF CORRECTION

PATENT NO. : 8,665,248 B2
APPLICATION NO. : 12/332751
DATED : March 4, 2014
INVENTOR(S) : Keitaro Yamashita It is certified that error appears in the above-identified patent and that said Letters Patent is hereby corrected as shown below:

Title Page, Item (73), Assignee Line 3: "TPO Displays Corp." should read - Chimei Innolux Corporation -.

Signed and Sealed this
Twenty-ninth Day of April, 2014

Michelle K. Lee

Michelle K. Lee
*Deputy Director of the United States Patent and Trademark Office*